United States Patent
Ito et al.

(10) Patent No.: US 9,251,016 B2
(45) Date of Patent: Feb. 2, 2016

(54) STORAGE SYSTEM, STORAGE CONTROL METHOD, AND STORAGE CONTROL PROGRAM

(75) Inventors: Mikio Ito, Kawasaki (JP); Hidejirou Daikokuya, Kawasaki (JP); Kazuhiko Ikeuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 227 days.

(21) Appl. No.: 12/010,435

(22) Filed: Jan. 24, 2008

(65) Prior Publication Data

US 2008/0183987 A1 Jul. 31, 2008

(30) Foreign Application Priority Data

Jan. 25, 2007 (JP) .................. 2007-015529

(51) Int. Cl.
G06F 12/00 (2006.01)
G06F 13/00 (2006.01)
G06F 13/28 (2006.01)
G06F 11/16 (2006.01)
G06F 11/00 (2006.01)
G06F 11/20 (2006.01)

(52) U.S. Cl.
CPC .......... G06F 11/1662 (2013.01); G06F 11/004 (2013.01); G06F 11/2094 (2013.01); G06F 11/2087 (2013.01)

(58) Field of Classification Search
CPC .............. G06F 11/1092; G06F 3/0689; G06F 11/2094; G06F 11/1088; G06F 11/2056
USPC .................................................. 711/114, 161
See application file for complete search history.

(56) References Cited

U.S. PATENT DOCUMENTS

| | | | |
|---|---|---|---|
| 7,028,216 B2 | 4/2006 | Aizawa et al. | |
| 2003/0229820 A1* | 12/2003 | Chatterjee | G06F 11/2061 714/6.32 |
| 2004/0103246 A1* | 5/2004 | Chatterjee et al. | 711/114 |
| 2005/0114728 A1 | 5/2005 | Aizawa et al. | |
| 2005/0283654 A1* | 12/2005 | Wood | G06F 11/1092 714/6.32 |
| 2006/0069947 A1 | 3/2006 | Takahashi et al. | |
| 2006/0117216 A1 | 6/2006 | Ikeuchi et al. | |

FOREIGN PATENT DOCUMENTS

| | | |
|---|---|---|
| JP | 2004-348332 | 12/2004 |
| JP | 2005-157739 | 6/2005 |
| JP | 2005-258633 | 9/2005 |

(Continued)

OTHER PUBLICATIONS

Japanese Office Action dated Mar. 6, 2012 issued in corresponding Japanese Patent Application No. 2007-015529.

(Continued)

*Primary Examiner* — Charles Rones
*Assistant Examiner* — Sidney Li
(74) *Attorney, Agent, or Firm* — Staas & Halsey LLP

(57) ABSTRACT

According to an aspect of an embodiment, a storage system for storing data from a host device, comprising: a plurality of storage units for storing data, in a manner to enable recovery of data stored in one of said storage units by the use of data stored in the rest of storage units; an extra storage unit; and a controller for controlling said storage units and said extra storage unit according to a process comprising: receiving information indicative of fault prediction in one of storage units, recovering data stored in said one of said storage units by the use of data storage in the rest of said storage units, and writing the recovered data into said extra storage unit.

8 Claims, 10 Drawing Sheets

(56) References Cited

FOREIGN PATENT DOCUMENTS

| | | |
|---|---|---|
| JP | 2006-79418 | 3/2006 |
| JP | 2006-139339 | 6/2006 |
| JP | 2006-268502 | 10/2006 |

OTHER PUBLICATIONS

English Translation of Japanese Notice of Reasons for Rejection mailed Dec. 13, 2011 issued in corresponding Japanese Patent Application No. 2007-015529.

* cited by examiner

FIG. 3

| SEGMENT (DISK LBA) | WRITE BACK FLAG |
|---|---|
| 0x00 | 1 |
| 0x80 | 0 |
| 0x100 | 0 |
| : | : |
| LAST LBA | 0 |

STORAGE SYSTEM, STORAGE CONTROL METHOD, AND STORAGE CONTROL PROGRAM

TECHNICAL FIELD

1. Field of the Invention

The present invention relates to a storage system.

2. Description of the Related Art

The followings are prior art technologies of the storage system.

Japanese unexamined patent publication No. 2005-157739

Japanese unexamined patent publication No. 2006-79418

SUMMARY

According to an aspect of an embodiment, a storage system for storing data from a host device, comprising: a plurality of storage units for storing data, in a manner to enable recovery of data stored in one of said storage units by the use of data stored in the rest of storage units; an extra storage unit; and a controller for controlling said storage units and said extra storage unit according to a process comprising: receiving information indicative of fault prediction in one of storage units, recovering data stored in said one of said storage units by the use of data storage in the rest of said storage units, and writing the recovered data into said extra storage unit.

BRIEF DESCRIPTION OF THE DRAWINGS

FIG. 3 is a structural diagram of a WB monitoring table of the embodiment;

DESCRIPTION OF THE PREFERRED EMBODIMENTS

At first, a storage device of a storage system before applying a present embodiment will be explained. The storage device has a plurality of storage units arranged to be redundant to enhance of a capability of retaining stored data. The storage device includes a disk array device for example. The disk array device has a plurality of disk devices as the plurality of storage units. There is RAID (Redundant Array of Independent Disks) as a storage method of the disk array device. The RAID is a data recording method for enhancing reliability in retaining data by redundantly composing the plurality of independent disk devices. The disk devices composing the RAID are called as member disks. Even when one of the member disks fails, data held by the faulty member disk may be recovered by data stored in the other member disks. Thus, protection of data may be realized by replacing the faulty disk. The disk device has a function of predicting and reporting its fault (SMART: Self-Monitoring, Analysis and Reporting Technology) because the disk device is required to have high reliability in terms of protection of data. A member disk of the RAID that outputs a fault prediction is replaced with an alternate disk device.

The data of the member disk that outputs such fault prediction (called as a fault-predicting disk hereinafter) is recovered by the data stored in the member disk (called as a normal disk hereinafter) other than the fault-predicting disk. The recovered data is written into a preliminary disk of the RAID. The series of the recovering process described above will be called as a Rebuilding process.

Because the fault-predicting disk is highly likely to cause a real fault in the future, it is desirable to suppress accesses to the fault-predicting disk as much as possible. However, when data written from a host computer is stored, it is necessary to write the data so as not cause any inconsistency of data among the member disks composing the RAID. The fault-predicting disk may fail as a result by accessing and writing data into the fault-predicting disk. If the fault-predicting disk actually fails, there remains no method for recovering the unread data if the data cannot be read to the normal disk during the Rebuilding process. When no data is read/written from/to the fault-predicting disk at all, however, it may create an area where the data stored in the normal disk is inconsistent with the fault-predicting disk, disabling to recover the data in the data inconsistent area.

The present embodiment will now be explained.

Figure 1:
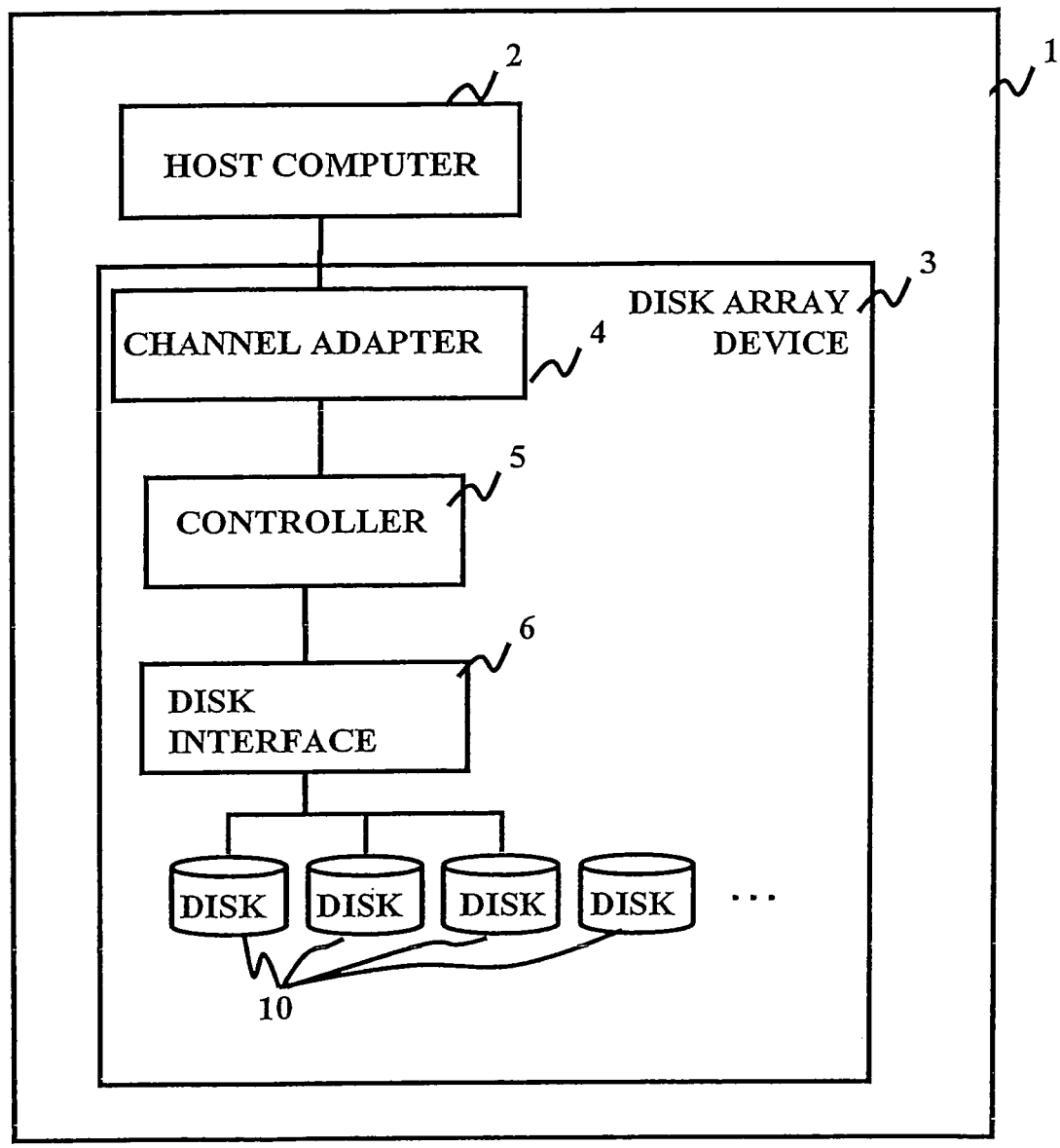
FIG. 1 is a structural diagram of a storage system according to an embodiment.

FIG. 1 is a structural diagram of a storage system 1 of the present embodiment.

The storage system 1 is composed of a host computer 2 and a disk array device 3. The host computer 2 controls the whole storage system 1 as well as data stored in the storage system 1. The host computer 2 transmits data to be stored to the disk array device 3 or reads the data stored in the disk array device 3.

The disk array device 3 stores the data sent from the host computer 2 and reads the stored data in response to a request from the host computer 2. The disk array device 3 composes the RAID (REDUNDANT ARRAY OF INDEPENDENT DISKS). The disk array device 3 stores data redundantly by having the arrangement of the RAID and can store the data more reliably. The disk array device 3 has a channel adapter 4, a controller 5, a disk interface 6 and a plurality of disk devices 10.

The channel adapter 4 is an interface for connecting the host computer 2 with the controller 5. That is, the channel adapter 4 connects the host computer 2 with the controller 5 within the disk array device 3.

The controller 5 controls the whole disk array device 3. For example, the controller 5 makes a control between the host computer 2 and the disk array device 3, a control of a cache memory for temporarily storing data received from the host computer 2 and a control of the RAID system composed of the plurality of disk devices 10. The controller 5 connects the channel adapter 4 with the disk interface 6 within the disk array device 3.

The disk interface 6 is an interface connecting the controller 5 with the respective disk devices 10 that store data.

The disk 10 stores/transmits data in response to instructions from the controller 5. Each disk device 10 has a SMART (Self-Monitoring, Analysis and Reporting Technology) function. The SMART is a function of detecting an error rate in reading/writing from/into the disk 10 in advance, of finding supposed time when the disk device is unable to operate due to the error rate and of outputting the supposed time thus found. The SMART is built in the standard of ATA/ATAPI.

The plurality of disk devices 10 is composed of disk devices (redundant storage units) functioning as the RAID and a preliminary disk device (preliminary storage unit). The preliminary storage device is a disk device that is replaced with a disk device that operates as the RAID when a disk device operating as the RAID fails or when it outputs a fail prediction by the SMART. A process of reconstructing the RAID by replacing the disk device operating as the RAID with the preliminary disk will be called a Rebuilding process.

Figure 2:
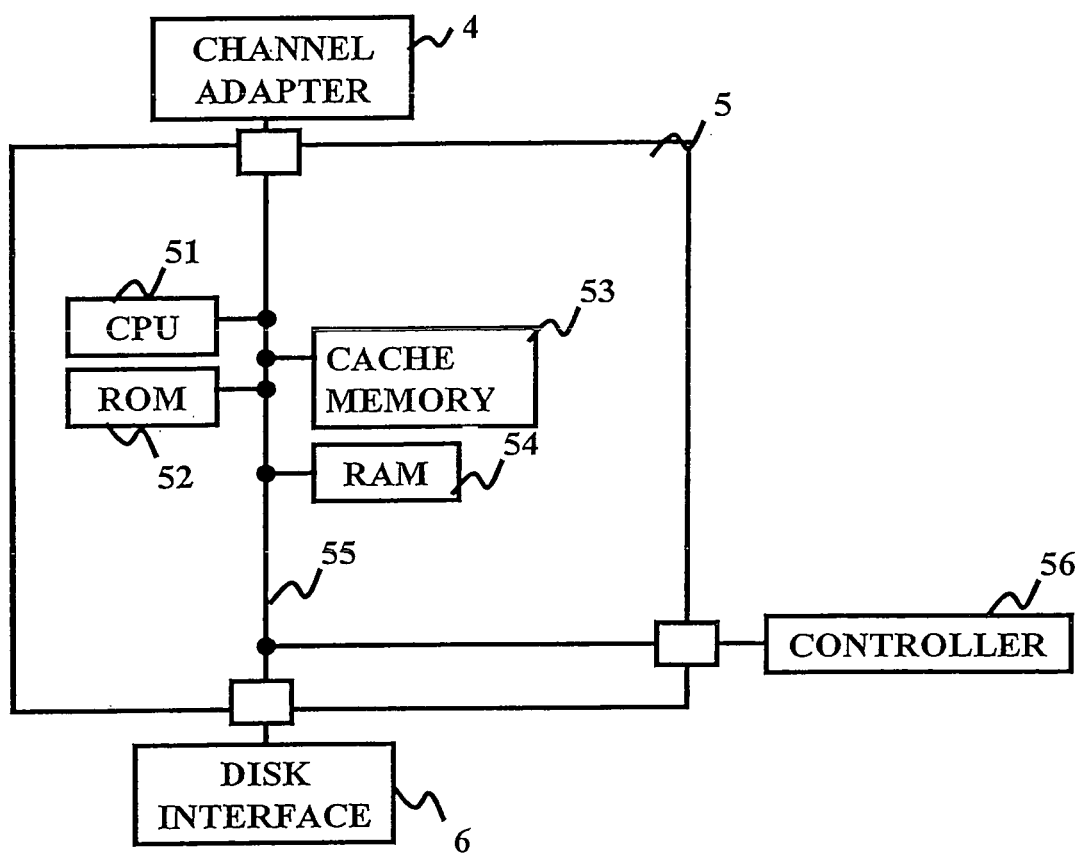
FIG. 2 is a structural diagram of a controller of the embodiment.

Next, a configuration of the controller 5 of the present embodiment will be explained. FIG. 2 is a structural diagram of the controller 5 of the embodiment. The controller 5 has a CPU (Central Processing Unit) 51, a ROM 52, a cache memory 53 and a RAM 54, which are connected each other through a bus 55.

The CPU 51 controls the whole controller 5. The CPU 51 functions as a reading module, writing module, recovering module, cache control module, RAID control module and the like by executing respective programs developed in the RAM 54.

The RAM 54 is a memory element directly accessed from the CPU 51. The respective programs (firmware) stored in the ROM 52 are developed in the RAM 54. The programs include, for example, an interface program for controlling interface between the host computer 2 and the disk array device 3, a cache control program for controlling management of data stored in the cache memory 53, a RAID control program for controlling the RAID composed of the plurality of disk devices 10, and the like. A Write-Back monitoring table 7 (called as a WB monitoring table 7 hereinafter) explained in FIG. 3 will be also developed in the RAM 54.

The Write-Back process is a process of the controller 5 that writes the data in the cache memory 53 into the respective disk devices 10 within the disk array device 3.

The cache memory 53 is a storage area where data sent from the host computer 2 and to be stored in the respective disk devices 10 within the disk array device 3 is temporarily stored. Data that is written into the cache memory 53 but not written back to the disk device, i.e., the final writing destination, is called as Dirty Data.

The disk array device 3 is often arranged to be redundant to enhance its reliability. The redundantly arranged disk array device 3 has a plurality of controllers that are connected from each other. The controller 5 is connected with another controller 56 to achieve the redundant arrangement in FIG. 2.

Figure 3:
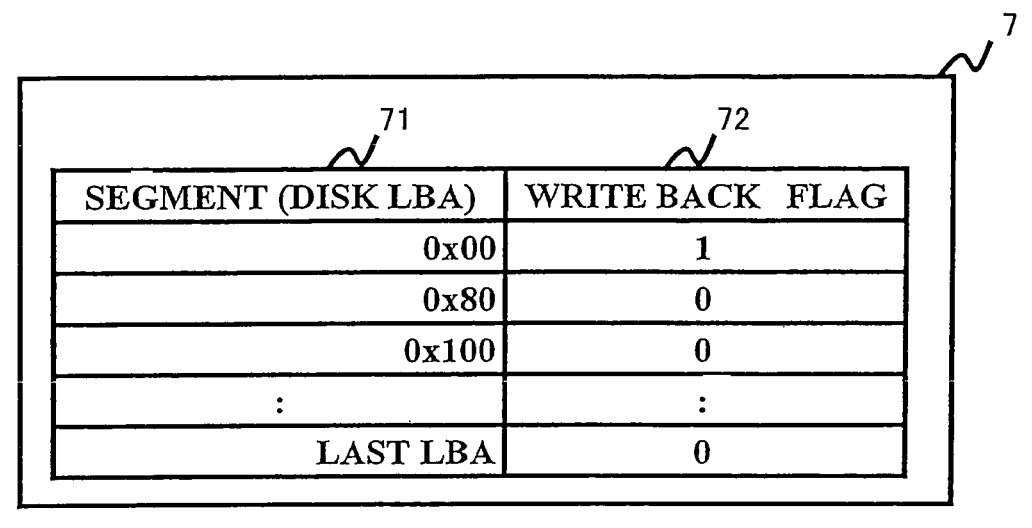

Next, a structure of the WB monitoring table 7 of the present embodiment will be explained. FIG. 3 is a structural diagram of the WB monitoring table 7 of the embodiment. The WB monitoring table 7 is a table prepared in performing the Rebuilding process to the preliminary disk device.

When the controller 5 performs the Rebuilding process to the preliminary disk, it monitors whether or not the Write-Back process to the preliminary disk device has been carried out during a period from start to completion of the Rebuilding process. The controller 5 develops the WB monitoring table 7 on the RAM 54 to monitor the Write-Back process. It is noted that it is possible to arrange such that the controller 5 excludes an area where the Rebuilding process has been already executed from the object of monitoring whether or not the Write-Back process has been carried out. It is because the area where the Rebuilding process has been executed is redundant as a group composing the RAID and no data is read out the disk device that has predicted a failure.

The controller 5 prepares the WB monitoring table 7 anew in an area of the RAM 54 in starting the Rebuilding process. Then, the controller 5 releases the WB monitoring table 7 in the area of the RAM 54 when the Rebuilding process is completed. It is noted that the controller 5 can correlate the preparation and release of the WB monitoring table 7 in the area of the RAM 54 with power On or Off of the disk array device 3.

The Write-Back process is carried out in a unit of block of the disk devices 10. LBA (Logical Block Address) is given to each block in order to be able to specify the block within the disk device. A data amount composing one block is 520 byte. Therefore, a size of the WB monitoring table 7 becomes too large if the Write-Back process is monitored per one block. When the Write-Back process is monitored per one block when a capacity of the disk device is 360 Gbyte, the size of the WB monitoring table 7 becomes about 7.5 Gbyte. Meanwhile, a range of the LBA required for the Write-Back process in writing data into the disk device is variable.

The variable range of the Write-Back process is one block to 2,048 blocks and 128 blocks are often used as the required size of one time of the Write-Back process. Then, the WB monitoring table 7 of the present embodiment sets 128 blocks as one segment and the controller 5 manages whether or not the Write-Back process has been carried out per one segment. When the Write-Back process is monitored per one segment when a capacity of the disk device is 36 Gbyte for example, the size of the WB monitoring table 7 is around 75 Kbyte. Then, it becomes possible to reduce the area of the RAM 54 dominated by the WB monitoring table 7 by monitoring the Write-Back process in the range of one segment.

The WB monitoring table 7 in FIG. 3 is composed of a disk LBA 71 and a WB indicating flag 72. The disk LBA 71 indicates a LBA of a head block of a segment when the unit is set to be the segment of the preliminary disk device. The WB indicating flag 72 is a flag indicating whether or not the Write-Back process has been carried out to the segment whose head block address is that in the disk LBA 71.

Furthermore, it is wasteful to dominate the area of the RAM 54 by developing the WB monitoring tables 7 of the whole numbers of the disk devices mounted in the disk array device 3 on the RAM 54. Therefore, a maximum number of the WB monitoring tables 7 concurrently developed per controller 5 is set in advance. For example, the WB monitoring table 7 corresponding to four disk devices is set per controller 5. When the controller 5 determines to execute the Rebuilding process concurrently to four or more disk devices, the controller 5 operates so as not to monitor the Write-Back process. It is because it may be better to stop and maintain the operation of the disk array device 3 when the maximum number of the WB monitoring tables 7 concurrently developed is larger than the value set in advance.

The WB monitoring table 7 of the present embodiment is arranged so as not to duplex between the controllers arranged redundantly within the disk array device 3. When an abnormality occurs in one controller of the disk array device 3 and when the abnormal controller is reactivated, it is arranged so as not to monitor the Write-Back process in order to arrange the controller to be independent per controller. Furthermore, when a controller causes an abnormality, a controller succeeding a process of the controller causing the abnormality is arranged so as not to monitor the Write-Back process. In the present embodiment, the controller 5 is arranged so as not to store the WB monitoring table 7 when the power of the whole disk array device 3 is turned On/Off in order to avoid the processes from becoming complex. It includes On/Off of the power caused by a power failure of the whole disk array device 3.

Figure 4:
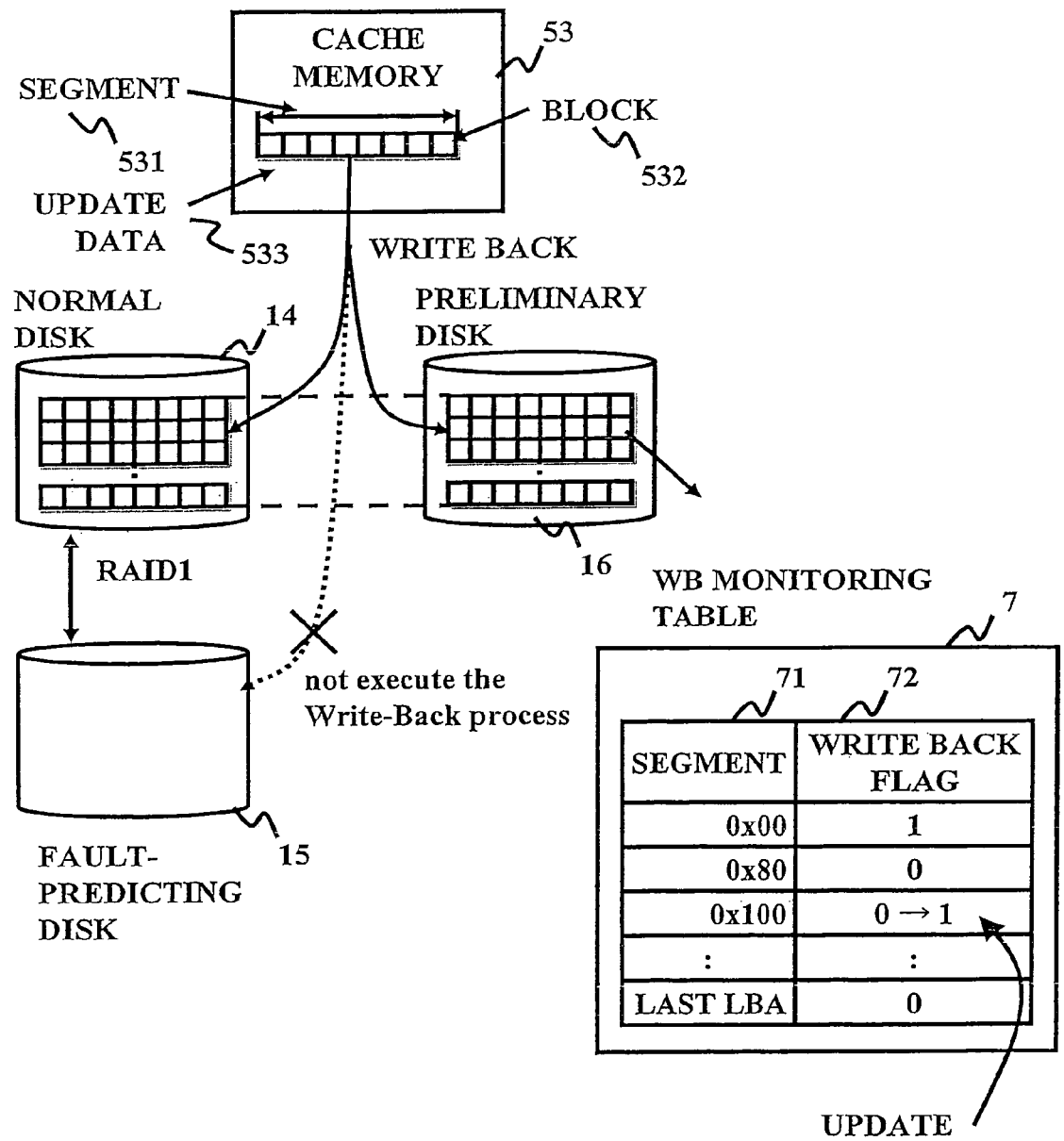
FIG. 4 is a diagram for explaining a flow of data in storing update data stored in a cache memory to respective disk devices.

Next, the Write-Back process during the rebuilding process will be explained. FIG. 4 is a diagram for explaining a flow of data in storing update data stored in the cache memory 53 to the respective disk devices. The update data 533 is data transmitted from the host computer 2, temporarily stored in the cache memory 53 and updated in the storage system 1.

The controller 5 stores the update data 533 to the respective disk devices. The update data 533 is managed per size of a segment 531. The segment 531 is a set of data of a plurality of continuous blocks 532.

A normal disk 14, a fault-predicting disk 15 and a preliminary disk 16 are disk devices 10 composing the disk array device 3. The fault-predicting disk 15 is a disk that reports fault-predicting information found by the SMART to the controller 5. The normal disk 14 is a disk device that normally operates continuously even after when the fault-predicting disk 15 has reported the fault-predicting information found by the SMART to the controller 5. The normal disk 14 and the fault-predicting disk 15 compose a RAID 1 in the present embodiment. The preliminary disk 16 is a preliminary disk device connected to the disk array device 3.

In the present embodiment, the controller 5 does not execute the Write-Back process to the fault-predicting disk 15 during the Rebuilding process in order not to increase a possibility of causing a fault of the fault-predicting disk 15. Because no Write-Back process is executed to the fault-predicting disk 15, data between the normal disk 14 and the fault-predicting disk 15 composing the RAID 1 is inconsistent. The data between the member disks is inconsistent means that there is no mirror consistency in case of the RAID 1 and no stripe consistency in case of a RAID 5. For the area in which data is inconsistent, the controller 5 is unable to recover data of the normal disk by the data of the fault-predicting disk. Then, instead of not writing to the fault-predicting disk during the Write-Back process, the controller 5 records the data area where the data is inconsistent between the member disks composing the RAID to the WB monitoring table 7 of the RAM 54. It is because the data area where the data is inconsistent coincides with a range in which the Write-Back process has been executed. Thus, the controller 5 can recover the data by using the fault-predicting disk when the data in the range in which the Write-Back process is not executed in the normal disk 14 cannot be read.

When the Write-Back process is executed during the Rebuilding process, the controller 5 executes the Write-Back process to the normal disk 14 and the preliminary disk 16. The controller 5 also records the segment to which the Write-Back process has been requested to the WB monitoring table 7. However, the controller 5 does not execute the Write-Back process to the fault-predicting disk 15. The controller 5 can recover the data because it has recorded the range of the inconsistency of the data between the member disks composing the RAID to the WB monitoring table 7.

Figure 5A:
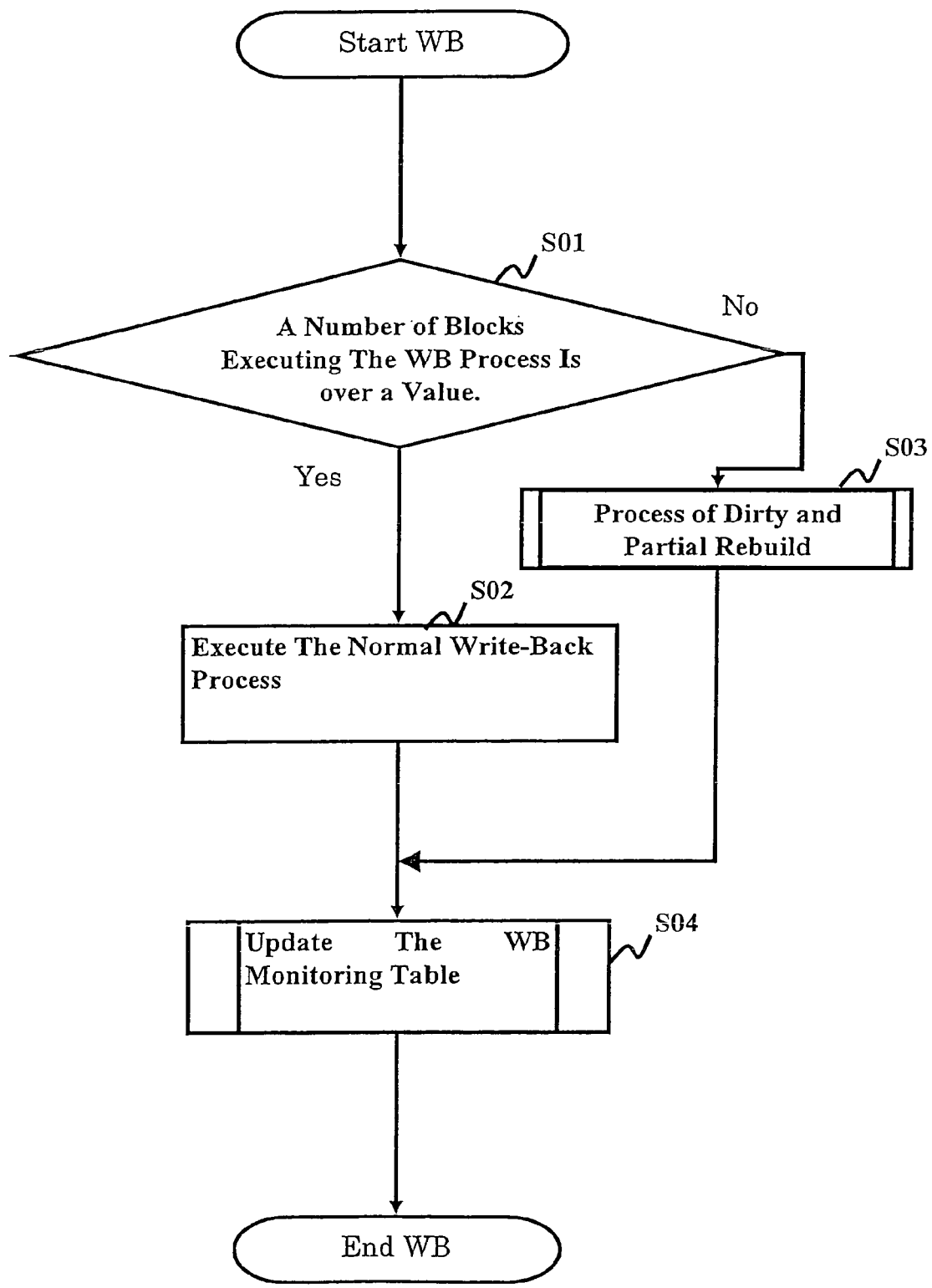
FIG. 5A and FIG. 5B are a flowchart showing a flow of Write-Back processes during a Rebuilding process.
Figure 5B:
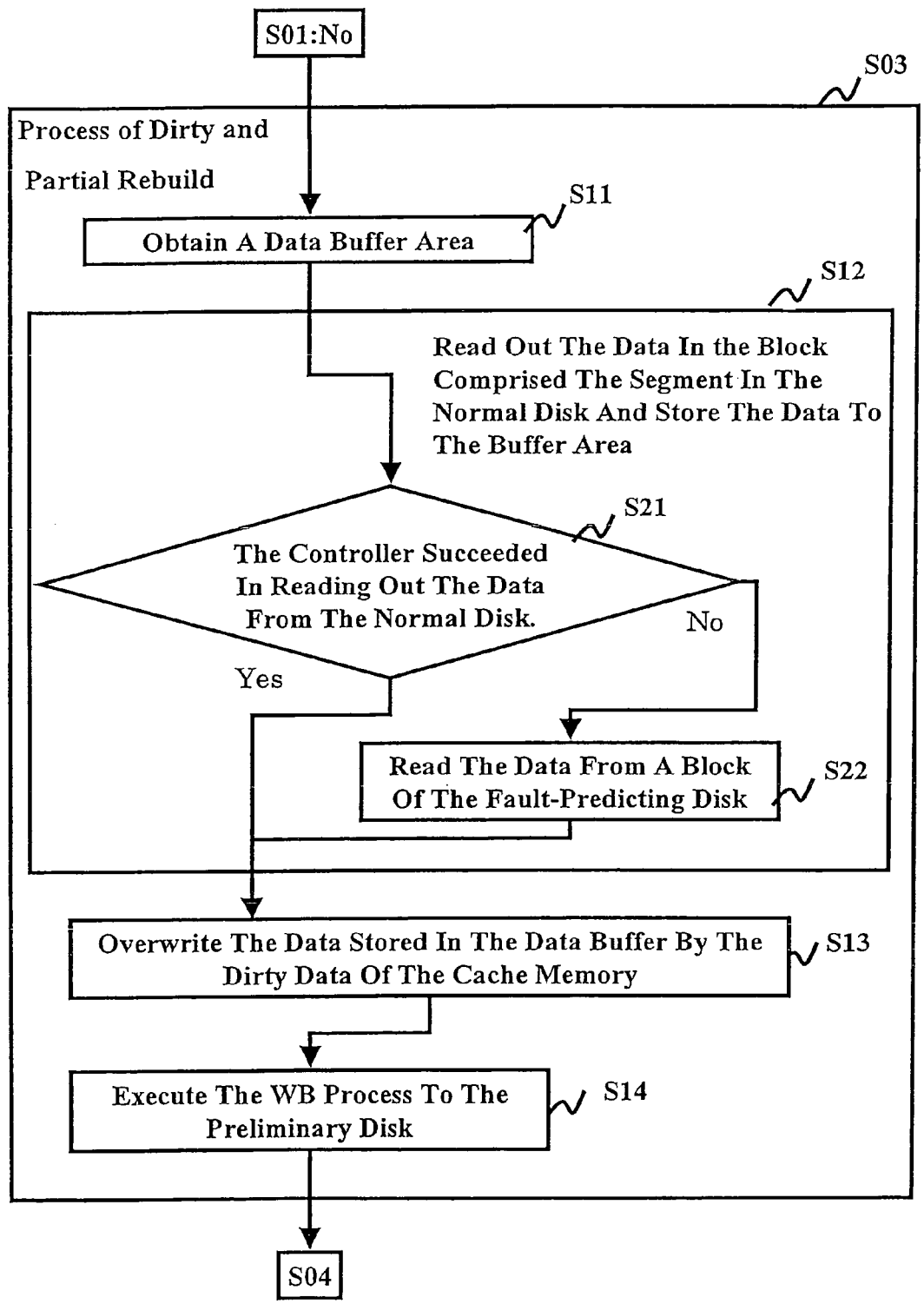

Next, a flow of the Write-Back process during the Rebuilding process executed by the controller 5 will be explained. FIG. 5A and FIG. 5B are a flowchart showing the flow of Write-Back process during the Rebuilding process.

The cache control module of the controller 5 calls out the RAID control module. In response to the data stored in the cache memory 53, the RAID control module of the controller 5 judges whether or not a number of blocks executing the Write-Back process is larger than a number of blocks composing the segments managed by the WB monitoring table 7 in Step S01.

When the number of blocks executing the Write-Back process is larger than the number of blocks composing the segment (Yes in Step S01), the controller 5 executes the normal Write-Back process to the normal disk 14 and the preliminary disk 16 in Step S02.

The RAID control module of the controller 5 updates the WB indicating flag 72 corresponding to the head LBA 71 of the processed segment in the WB monitoring table 7 from "0" to "1" in Step S04. After that, the RAID control module of the controller 5 responses to the cache control module that the Write-Back process has been completed.

Figure 6:
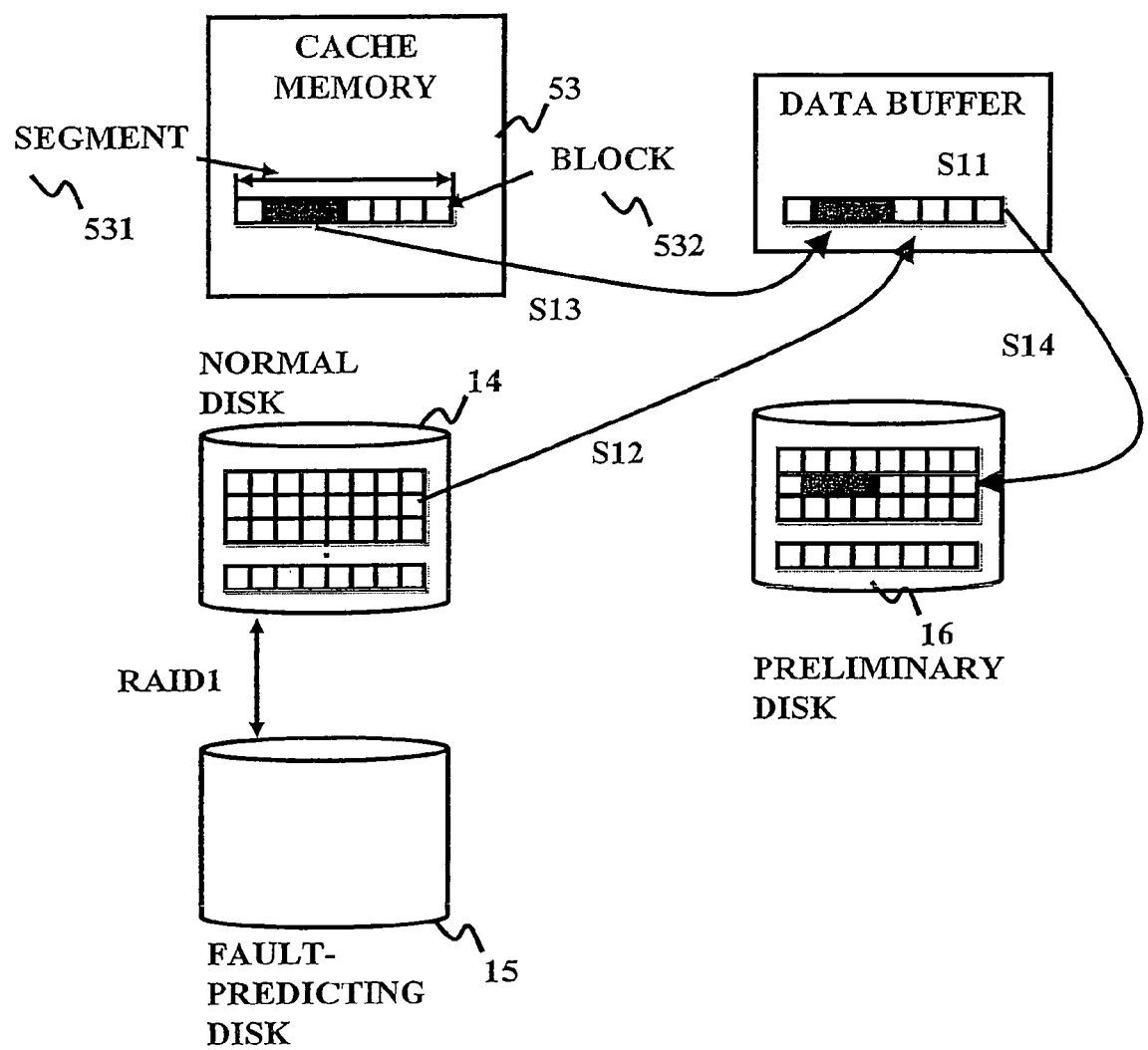
FIG. 6 is a diagram explaining a state when a number of blocks of a segment is larger than a number of blocks of the Write-Back process.

Meanwhile, the number of blocks requested to carry out the Write-Back process from the host computer 2 fluctuates. Therefore, there is a case when the Write-Back process of the number of blocks less than the 128 blocks that is the unit of the segment is requested. FIG. 6 is a diagram explaining a state when the number of blocks of the segment is larger than the number of blocks of the Write-Back process. When the number of blocks executing the Write-Back process is less than the number of blocks composing the segment (No in Step S01), the controller 5 executes the following Writing process in Step S03. At first, the controller 5 executes the Write-Back process to the normal disk 14.

The RAID control module of the controller 5 obtains a data buffer area for temporarily storing data to be written into the disk 10 within the cache memory 53 in Step S11. The data buffer area obtained by the controller 5 is in the unit of the segment. The controller 5 reads the segment on which the Write-Back process is to be executed out of the normal disk 14 in Step S12. The controller 5 stores the data in the segment read out of the normal disk 14 to the data buffer. The controller 5 overwrites the data stored in the data buffer by the dirty data of the cache memory 53 in Step S13.

The controller 5 executes the Write-Back process of the data in the data buffer to the preliminary disk 16. Then, the controller 5 updates the flag 732 of the WB monitoring table 7 in Step S14. In the present embodiment, the controller 5 updates a value of the flag 732 from "0" to "1".

The controller 5 executes the Write-Back process to the normal disk 14 and the preliminary disk 16. The controller 5 may execute the Write-Back process to the normal disk 14 and the preliminary disk 16 concurrently or may execute the Write-Back process to the preliminary disk 16 after completing the Write-Back process to the normal disk 14. The controller 5 can omit the dirty data overwriting process in executing the Write-Back process to the preliminary disk 16 after completing the Write-Back process to the normal disk 14 because the dirty data during the Write-Back process is contained in the segment. However, because the controller 5 is unable to execute the Write-Back process concurrently, a time required for the Write-Back process is prolonged as compared to the concurrent Write-Back process.

The controller 5 can read the blocks in the segment of the normal disk 14 also by skipping the block corresponding to the dirty data stored in the cache memory 53. However, the controller 5 increases a number of commands of the Reading process to the normal disk 14.

Figure 7:
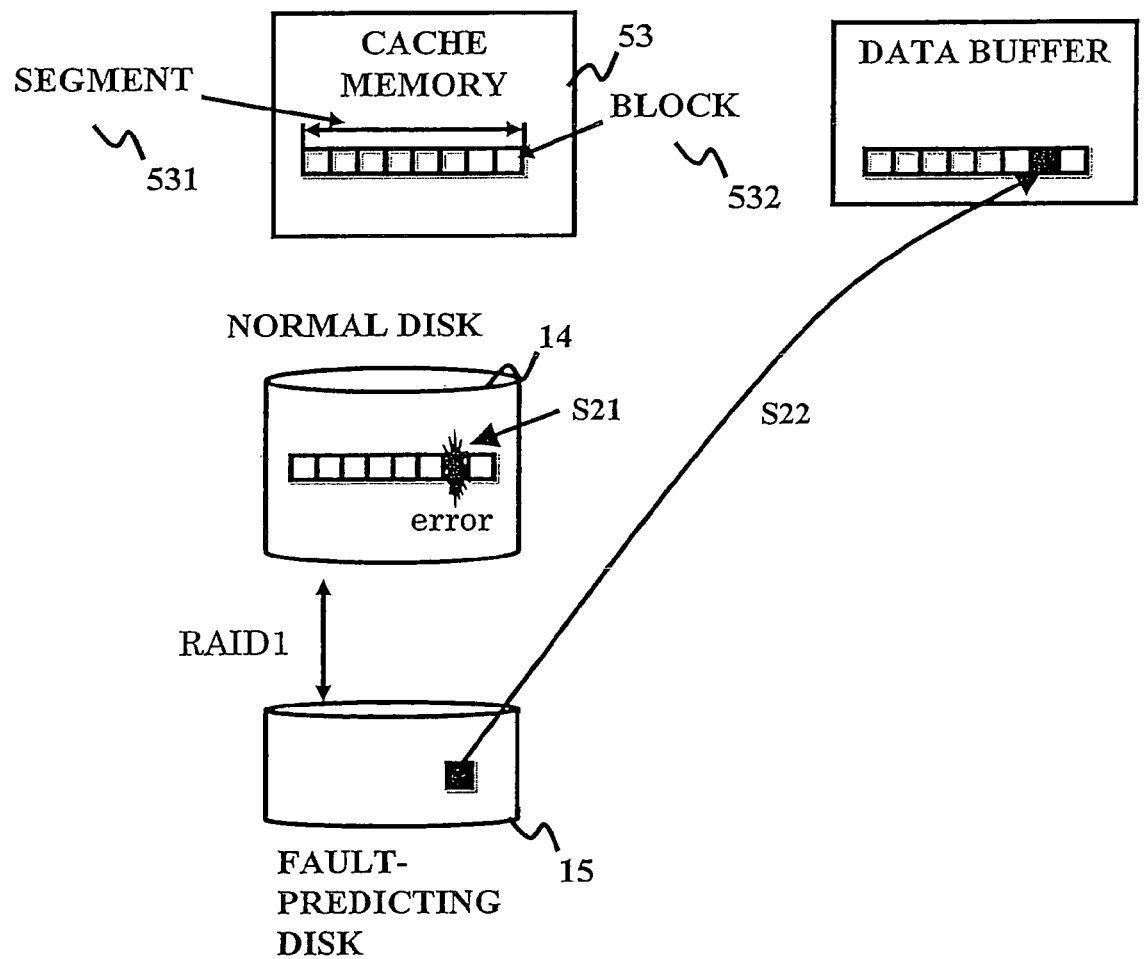
FIG. 7 is a diagram explaining a process carried out when data cannot be read out of a normal disk when the controller develops data of part of the segment stored in a cache memory to a data buffer.

Next, a process carried out when a part of the segment is stored in the cache memory 53 and when the controller 5 cannot read data out of the normal disk 14 in reading the part of data in the segment stored in the cache memory 53 to the data buffer will be explained. FIG. 7 is a diagram explaining the process carried out when data cannot be read out of the normal disk 14 in developing the data of part of the segment stored in the cache memory to the data buffer.

When the controller 5 is unable to read the data in the block belonging to the object segment of the normal disk 14 (No in Step S21), the controller 5 reads the data from a block of the fault-predicting disk 15 corresponding to the block that cannot be read out of the normal disk 14 in Step S22. The controller 5 prepares data composing the segment from the data of the block read out of the fault-predicting disk 15 and the data of the block read out of the normal disk 14 in the data buffer. After that, the controller 5 executes processes on and after Step S13.

Figure 8:
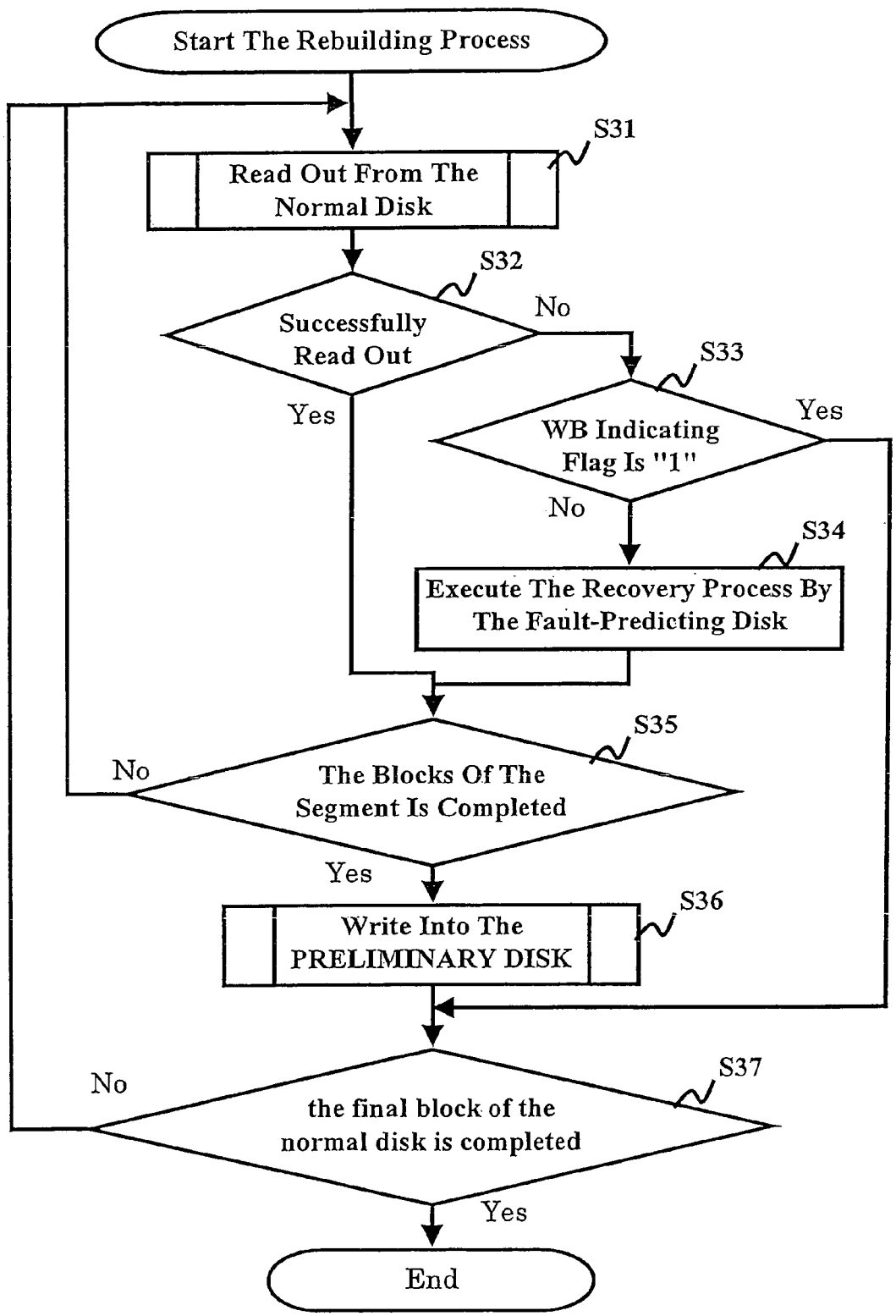
FIG. 8 is a flowchart of processes of the controller in recovering data.
Figure 9:
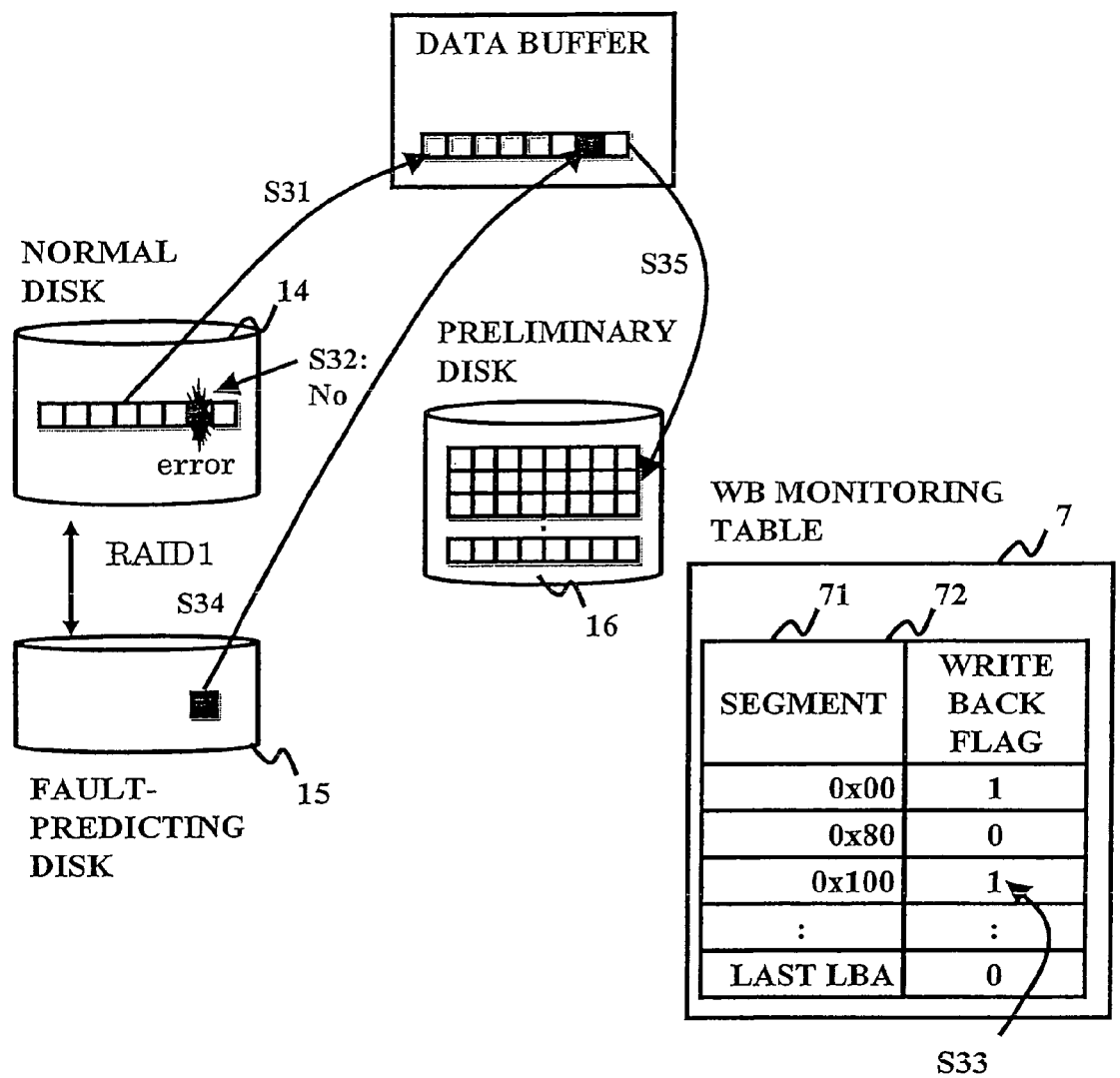
FIG. 9 is a diagram explaining operations of the processes of the controller in recovering the data.

Next, the operation of the controller 5 in carrying out the Rebuilding process to the preliminary disk 16 will be explained. FIG. 8 is a flowchart of processes of the controller 5 in recovering data and FIG. 9 is a diagram explaining the operations of the processes of the controller 5 in recovering the data.

The controller 5 starts the Rebuilding process by reading the data corresponding to the segment out of the normal disk 14 in Step S31. Then, the controller 5 judges whether or not the data could have been successfully read out in Step S32. For instance, the controller 5 judges that the data could not have been normally read out when it obtains a result that a medium is erroneous by a value of a response status of the disk device.

When the controller 5 could not read a segment that is an object of the Write-Back process out of the normal disk 14, (No in Step S32), it calls out the RAID control program and executes a recovering process for the data of the block not read out of the normal disk 14.

When the data could not have been normally read on the other hand (No in Step S32), it judges whether or not the Write-Back process of the segment corresponding to the data that could not have been read has been carried out by the WB indicating flag 72 of the WB monitoring table 7 in Step S33. When the block that could not have been read is contained in the segment in which the Write-Back process has been already carried out, data that can recover the data of the normal disk 14 has already been written into each block within the preliminary disk 16 corresponding to the segment. Therefore, when the WB indicating flag 72 of the WB monitoring table 7 is the block contained in the segment of "1" (Yes in Step S33), the controller 5 skips the Write-Back process to the current segment.

In case of the segment to which the Write-Back process has been previously executed, the data stored in the segment of the preliminary disk and the data stored in the segment of the normal disk 14 has a RAID redundant relationship. Accordingly, it becomes unnecessary to recover the data by using the fault-predicting disk 15, and the controller 5 does not execute the Write-Back process to the preliminary disk 16 and executes the Rebuilding process for the next segment.

It is noted that the controller 5 can also execute the recovering process of the data of the block that could not have been read out of the normal disk 14 by using the preliminary disk 16. Not only detection of abnormality of the block by the disk patrol but also a chance of recovering a medium error of the normal disk 14 increases by carrying out the recovering process during the Rebuilding process. It improves a probability of retaining data of the disk array device 3.

When the Write-Back process has not been executed on the segment containing the block that could not have been read (No in Step S33), the controller 5 reads the block that could not have been read out of the normal disk 14 out of the normal disk 15 and executes the recovering process in Step S34. Specifically, the controller 5 reads the data corresponding to the block that could not have been read out of the normal disk 14 out of the fault-predicting disk 15 and stores the read data to the data buffer. The controller 5 reads remaining blocks of the segment that is an object of the process out the normal disk 14 and stores them to the data buffer in Step S35.

The controller 5 writes the data in the unit of segment stored in the data buffer to the preliminary disk 16 in Step S36. After writing the data, the controller 5 carries out a verifying process whether or not the data has been correctly written. The controller 5 executes the Rebuilding process until completion of the final block of the normal disk 14. Specifically, the controller 5 repeats a process of reading a data block corresponding to a next LBA of a data block read out of the fault-predicting disk 15 from the normal disk 14 from Step S31 and stores them to the data buffer. That is, the controller 5 repeats the process until storing the final block of the segment to the data buffer.

The controller 5 ends the Rebuilding process when the storage of the final block of the normal disk is completed (Yes in Step S37). When the Rebuilding process is completed, the controller 5 releases the area of the WB monitoring table 7 stored on the RAM 54. The controller 5 also determines that the fault-predicting disk 15 is faulty.

The controller 5 can also judge whether or not the segment of the preliminary disk 16 is an area to which the Write-Back process has been already executed by the WB indicating flag 72 of the WB monitoring table 7. When the controller 5 judges that it is a segment to which the Write-Back process has been already executed, it can skip the Rebuilding process of the segment of the object.

Next, the Rebuilding process executed when a basic number of blocks of the Rebuilding process is inconsistent with a number of blocks composing a segment monitored by the WB monitoring table 7 will be explained. Executing the Rebuilding process for a part of the segment is called as partial rebuilding.

When the basic number of blocks of the Rebuilding process is smaller than the number of blocks of the segment monitored by the WB monitoring table 7, the Rebuilding process may be executed by the same process with the case when the numbers of blocks are equal.

When the basic number of blocks of the Rebuilding process is larger than the number of blocks of the segment monitored by the WB monitoring table 7 in contrary, the controller 5 divides a group of blocks to which the Rebuilding process is to be executed per each segment and executes the Rebuilding process per each divided segment.

The prior art management achieved by information of failure of the Write-Back process has been carried out by judging whether or not data of the fault-predicting disk can be used when a medium error is detected in the reading process to a normal disk during the Rebuilding process by managing whether or not a Write command is effective to the fault-predicting disk. The prior art managing method writes bad data to the preliminary disk in executing the recovering process by using the area of the fault-predicting disk that has failed the Write process. However, because the Writing process to the fault-predicting disk is still continued, the fault-predicting disk is much likely to fail.

The recovering process that is executed when a data reading error occurs in the normal disk during the Rebuilding process is carried out by reading the data out of the fault-predicting disk in the present embodiment. When the data cannot be read out of the normal disk in the Rebuilding process, the present embodiment increases the probability of recovering the data by executing the recovery by means of the fault-predicting disk on the basis of the state of the Write-Back process in the present embodiment. The present embodiment can also reduce a burden on the fault-predicting disk because no Write-Back process is executed on the fault-predicting disk. The present embodiment also increases data recovered in the Rebuilding process.

Although the RAID 1 that is a mirror ring has been explained in the present embodiment, the invention is applicable also to other RAID configurations. In case of the RAID 5 for example, data to be written into the disk device may be prepared by recovering the data by a plurality of normal disks.

What is claimed is:

1. A storage system storing configured to store data received from a host device, the storage system comprising:
   a first storage device;
   a second storage device to enable recovery of data of the first storage device using data stored in the first storage device;
   a preliminary storage device;
   a data buffer;
   a memory configured to store a plurality of addresses respectively corresponding to one of a plurality of segments of the preliminary storage device, an address among the plurality of addresses being associated with a flag indicating whether or not a write-back process has been carried out to a segment corresponding to the flag; and
   a processor configured to execute:
      reading data corresponding to a segment among the plurality of segments from the second storage device;
      determining whether the data has been successfully read from the second storage device;
      determining, by referring to the memory, whether a flag corresponding to the data indicates that the write-back process of the segment has been carried out, when determining reading of the data from the second storage device is unsuccessful;
      reading a block corresponding to a block of the segment that has not been read out of the second storage device from the first storage device, storing the read block to the data buffer, reading remaining blocks of the segment from the second storage device, and storing the remaining blocks to the data buffer when determining that the flag corresponding to the data does not indicate that the write-back process of the segment has been carried out; and
      writing the block and the remaining blocks to the preliminary storage device.

2. The storage system according to claim 1, wherein the processor is configured to determine that reading of the data from the second storage device is unsuccessful when the processor obtains a result that a medium is erroneous by a value of a response status of the second storage device.

3. The storage system according to claim 1, wherein at least one of the first storage device, the second storage device and the preliminary storage device is a hard disk drive.

4. The storage system according to claim 1, wherein the first storage device has a function of fault prediction to find a time indicating when the first storage device is unable to operate due to an error rate detected in reading from and writing to another storage device.

5. The storage system according to claim 1, comprising:
   a cache memory where data sent from a host device is temporary stored until stored in a storage device included in the storage system.

6. The storage system according to claim 1, wherein the first storage device is replaced with the preliminary storage device.

7. A method executed by a processor including in a storage system, the storage system including a first storage device, a second storage device to enable recovery of data of the first storage device using data stored in the first storage device, a preliminary storage device, a data buffer, and a memory configured to store a plurality of addresses respectively corresponding to one of a plurality of segments of the preliminary storage device, an address among the plurality of addresses being associated with a flag indicating whether or not a write-back process has been carried out to a segment corresponding to the flag, the method comprising:
   reading data corresponding to a segment among the plurality of segments from the second storage device;
   determining whether the data has been successfully read from the second storage device:
   determining, by referring to the memory, whether a flag corresponding to the data indicates that the write-back process of the segment has been carried out, when determining reading of the data from the second storage device is unsuccessful;
   reading a block corresponding to a block of the segment that has not been read out of the second storage device from the first storage device, storing the read block to the data buffer, reading remaining blocks of the segment from the second storage device, and storing the remaining blocks to the data buffer, when determining that the flag corresponding to the data does not indicate that the write-back process of the segment has not been carried out; and
   writing the block and the remaining blocks to the preliminary storage device.

8. A non-transitory computer-readable storage medium storing a program that causes one or more processors including in a storage system to execute a process, the storage system including a first storage device, a second storage device to enable recovery of data of the first storage device using data stored in the first storage device, a preliminary storage device, a data buffer, and a memory configured to store a plurality of addresses respectively corresponding to one of a plurality of segments of the preliminary storage device, an address among the plurality of addresses being associated with a flag indicating whether or not a write-back process has been carried out to a segment corresponding to the flag, the process comprising:
   reading data corresponding to a segment among the plurality of segments from the second storage device;
   determining whether the data has been successfully read from the second storage device;
   determining, by referring to the memory, whether a flag corresponding to the data indicates that the write-back process of the segment has been carried out, when determining reading of the data from the second storage device is unsuccessful;
   reading a block corresponding to a block of the segment that has not been read out of the second storage device from the first storage device, storing the read block to the data buffer, reading remaining blocks of the segment that is an object of the process from the second storage device, and storing the remaining blocks to the data buffer, when determining that the flag corresponding to the data does not indicate that the write-back process of the segment has been carried out; and
   writing the block and the remaining blocks to the preliminary storage device.

* * * * *